(12) United States Patent  
Indurthi et al.

(10) Patent No.: US 11,551,675 B2
(45) Date of Patent: Jan. 10, 2023

(54) ELECTRONIC DEVICE AND METHOD FOR CONTROLLING THE ELECTRONIC DEVICE THEREOF

(71) Applicant: Samsung Electronics Co., Ltd., Suwon-si (KR)

(72) Inventors: Sathish Reddy Indurthi, Suwon-si (KR); Hyojung Han, Suwon-si (KR); Beomseok Lee, Suwon-si (KR); Insoo Chung, Suwon-si (KR); Nikhil Kumar Lakumarapu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 267 days.

(21) Appl. No.: 16/899,987

(22) Filed: Jun. 12, 2020

(65) Prior Publication Data

US 2021/0065690 A1    Mar. 4, 2021

(30) Foreign Application Priority Data

Sep. 3, 2019 (KR) .......................... 10-2019-0108961
Nov. 22, 2019 (KR) .......................... 10-2019-0151482

(51) Int. Cl.
  *G10L 15/183* (2013.01)
  *G10L 15/26* (2006.01)
  *G10L 15/16* (2006.01)
(52) U.S. Cl.
  CPC ............ *G10L 15/183* (2013.01); *G10L 15/16* (2013.01); *G10L 15/26* (2013.01)
(58) Field of Classification Search
  CPC ......... G10L 15/00; G10L 15/16; G10L 15/26; G10L 15/183
  See application file for complete search history.

(56) References Cited

U.S. PATENT DOCUMENTS 8,204,739 B2    6/2012   Waibel et al.
8,972,268 B2    3/2015   Waibel et al.
(Continued)

FOREIGN PATENT DOCUMENTS

KR    10-2019-0085879 A    7/2019
KR    10-2019-0085883 A    7/2019

OTHER PUBLICATIONS

Hu, Z., Chen, T., Chang, K.W., Sun, Y.: "Few-shot representation learning for out-of-vocabulary words." In: Proceedings of the 57th Annual Meeting of the Association for Computational Linguistics, pp. 4102-4112. Association for Computational Linguistics, Florence, Italy (Jul. 2019) (Year: 2019).*

(Continued)

*Primary Examiner* — Lamont M Spooner
*Assistant Examiner* — Sean E Serraguard
(74) *Attorney, Agent, or Firm* — Jefferson IP Law, LLP

(57) ABSTRACT

An electronic device is provided. The electronic device includes a memory configured to store a speech translation model and at least one processor electronically connected with the memory. The at least one processor is configured to train the speech translation model based on first information related to conversion between a speech in a first language and a text corresponding to the speech in the first language, and second information related to conversion between a text in the first language and a text in a second language corresponding to the text in the first language, and the speech translation model is trained to convert a speech in the first language into a text in the second language and output the text.

16 Claims, 6 Drawing Sheets

(56) References Cited

U.S. PATENT DOCUMENTS

| | | | |
|---|---|---|---|
| 10,025,781 B2 | 7/2018 | Lebeau et al. | |
| 11,328,133 B2* | 5/2022 | Xiong | G10L 25/24 |
| 2015/0046147 A1* | 2/2015 | Waibel | G06F 40/58 |
| | | | 704/2 |
| 2017/0148433 A1 | 5/2017 | Catanzaro et al. | |
| 2019/0147298 A1 | 5/2019 | Rabinovich et al. | |
| 2020/0034436 A1* | 1/2020 | Chen | G06F 40/58 |
| 2020/0082806 A1 | 3/2020 | Kim et al. | |
| 2020/0342852 A1* | 10/2020 | Kim | G10L 13/10 |

OTHER PUBLICATIONS

Jiatao Gu et al., Meta-Learning for Low-Resource Neural Machine Translation, Proceedings of the 2018 Conference on Empirical Methods in Natural Language Processing, Oct. 31-Nov. 4, 2018, pp. 3622-3631, Brussels, Belgium.

Ye Jia et al., Direct speech-to-speech translation with a sequence-to-sequence model, INTERSPEECH 2019, Sep. 15-19, 2019, Graz, Austria.

Chelsea Finn et al., Model-Agnostic Meta-Learning for Fast Adaptation of Deep Networks, ICML 2017, Sydney, Australia.

Sameer Bansal et al., Pre-training on High-Resource Speech Recognition Improves Low-Resource Speech-to-Text Translation, NAACL 2019, Jun. 2-Jun. 7, 2019, pp. 58-68, Minneapolis, Minnesota.

Ron J. Weiss et al., Sequence-to-Sequence Models Can Directly Translate Foreign Speech, INTERSPEECH 2017, Aug. 20-24, 2017, Stockholm, Sweden.

Mattia Antonino Di Gangi et al., MuST-C: a Multilingual Speech Translation Corpus, NAACL 2019, Jun. 2-Jun. 7, 2019, pp. 2012-2017, Minneapolis, Minnesota.

Matt Post, A Call for Clarity in Reporting BLEU Scores, Proceedings of the Third Conference on Machine Translation (WMT), vol. 1: Research Papers, pp. 186-191, Oct. 31-Nov. 1, 2018, Belgium, Brussels.

* cited by examiner

ELECTRONIC DEVICE AND METHOD FOR CONTROLLING THE ELECTRONIC DEVICE THEREOF

CROSS-REFERENCE TO RELATED APPLICATION(S)

This application is based on and claims priority under 35 U.S.C. § 119(a) of a Korean patent application number 10-2019-0108961, filed on Sep. 3, 2019, in the Korean Intellectual Property Office, and of a Korean patent application number 10-2019-0151482, filed on Nov. 22, 2019, in the Korean Intellectual Property Office, the disclosure of each of which is incorporated by reference herein in its entirety.

BACKGROUND

1. Field

The disclosure relates to an electronic device and a method for controlling thereof. More particularly, the disclosure relates to an electronic device that can perform translation for a user speech by using speech translation, and a method for controlling thereof.

2. Description of Related Art

Recently, artificial intelligence systems are being used in various fields. In particular, artificial intelligence systems are being used widely in the field of translating various languages.

In the past, a speech recognition model and a machine translation model were used for translating a user speech input in a first language into a text in a second language. For example, a user speech in a first language was converted into a text in the first language, and the converted text in the first language was translated into a text in a second language.

However, in this case, necessary resources increased as two kinds of models were used, and accordingly, there were problems that relatively long time was consumed until a user acquired a translated result text, and errors were worsened as the process went through each model.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems, and/or disadvantages and to provide at least the advantages described below Accordingly, an aspect of the disclosure is to provide an electronic device that can perform end-to-end translation of a speech in a first language into a second language by using a speech translation model, and a method for controlling thereof.

Additional aspects will be set forth in part in the description which follows and, in part, will be apparent from the description, or may be learned by practice of the presented embodiments.

In accordance with an aspect the disclosure, an electronic device is provided. The electronic device includes a memory configured to store a speech translation model and at least one processor electronically connected with the memory.

The at least one processor trains the speech model based on first information related to conversion between a speech in a first language and a text corresponding to the speech in the first language, and second information related to conversion between a text in the first language and a text in a second language corresponding to the text in the first language.

The speech translation model is trained to convert a speech in the first language into a text in the second language and output the text.

Here, the speech translation model includes a plurality of neural network layers.

The at least one processor makes weight value information corresponding to each of the plurality of neural network layers meta-learn based on the first information and the second information.

The at least one processor fine-tunes the learned weight value information to correspond to the speech translation model.

The at least one processor trains the speech translation model based on the first information, the second information, and third information related to conversion between a speech in the second language and a text corresponding to the speech in the second language.

Here, the meta-learning is a model-agnostic meta-learning (MAML) method.

The first information is acquired based on first sample data including a speech in the first language and a text corresponding to the speech in the first language, and the second information is acquired based on second sample data including a text in the first language and a text in the second language corresponding to the text in the first language.

The speech translation model is trained by using a sequence-to-sequence model.

The trained speech translation model is updated by comparing a text in the second language which is a converted form of a speech in the first language through the speech translation model and a text in the second language acquired by applying the first information and the second information to a speech in the first language.

The first information includes information acquired based on a conversion rule between a speech in the first language and a text corresponding to the speech in the first language, and the second information includes information acquired based on a conversion rule between a text in the first language and a text in the second language corresponding to the text in the first language.

The speech translation model is implemented as a single artificial intelligence model.

In accordance with another aspect of the disclosure, a method of controlling an electronic device storing a speech translation model is provided. The method includes the operations of acquiring first information related to conversion between a speech in a first language and a text corresponding to the speech in the first language, and second information related to conversion between a text in the first language and a text in a second language corresponding to the text in the first language, and training the speech translation model based on the first information and the second information.

Here, the speech translation model is trained to convert a speech in the first language into a text in the second language and output the text.

In the controlling method of an electronic device, the speech translation model includes a plurality of neural network layers, and the controlling method further includes the operation of making weight value information corresponding to each of the plurality of neural network layers meta-learn based on the first information and the second information.

The controlling method of an electronic device further includes the operation of fine-tuning the learned weight value information to correspond to the speech translation model.

In the operation of training the speech translation model, the speech translation model is trained based on the first information, the second information, and third information related to conversion between a speech in the second language and a text corresponding to the speech in the second language.

The meta-learning is a model-agnostic meta-learning (MAML) method.

The first information is acquired based on first sample data including a speech in the first language and a text corresponding to the speech in the first language, and the second information is acquired based on second sample data including a text in the first language and a text in the second language corresponding to the text in the first language.

The speech translation model is trained by using a sequence-to-sequence model.

The trained speech translation model is updated by comparing a text in the second language which is a converted form of a speech in the first language through the speech translation model and a text in the second language acquired by applying the first information and the second information to a speech in the first language.

The first information includes information acquired based on a conversion rule between a speech in the first language and a text corresponding to the speech in the first language, and the second information includes information acquired based on a conversion rule between a text in the first language and a text in the second language corresponding to the text in the first language.

The speech translation model is implemented as a single artificial intelligence model.

According to the various embodiments of the disclosure as described above, even if the amount of learning data for speech translation converting a speech in a first language into a text in a second language is small, a speech translation model can be trained by using speech recognition data, and translation data between texts.

Accordingly, accuracy of a speech translation job can be improved.

Other aspects, advantages, and salient features of the disclosure will become apparent to those skilled in the art from the following detailed description, which, taken in conjunction with the annexed drawings, discloses various embodiments of the disclosure

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
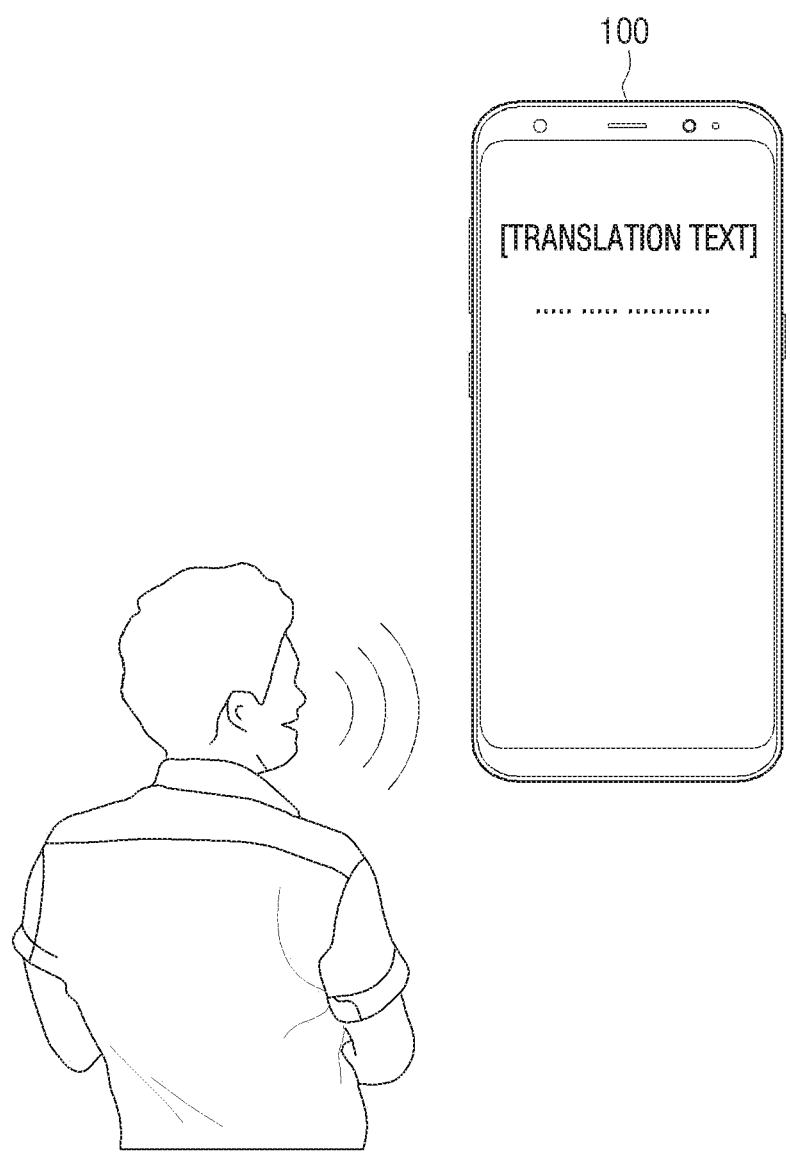
FIG. 1 is a diagram schematically illustrating speech translation according to an embodiment of the disclosure.

FIG. 1 is a diagram schematically illustrating speech translation according to an embodiment of the disclosure.

Referring to FIG. 1, an electronic device 100 may include a speech translation model translating an input user speech into a target language. Here, the speech translation model may be a model converting a speech input in a first language into a text in a second language which is a target language. Meanwhile, the electronic device 100 may be implemented as a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a medical device, a camera, a home appliance (e.g., a television (TV), a refrigerator, and the like), or a wearable device, and the like.

Meanwhile, the speech translation model needs to be trained for translating a speech in a first language into a second language, and in this case, it is desirable that the speech translation model is trained by using data wherein a speech in a first language is converted into a text in a second language as learning data. Meanwhile, in case the amount of learning data in this regard is small, the speech translation model may be trained by using data wherein a speech in a first language is converted into a text in the first language through a speech recognition model and data wherein a text in a first language is converted into a text in a second language through a machine translation model as learning data, and detailed explanation in this regard will be made below.

Figure 2:
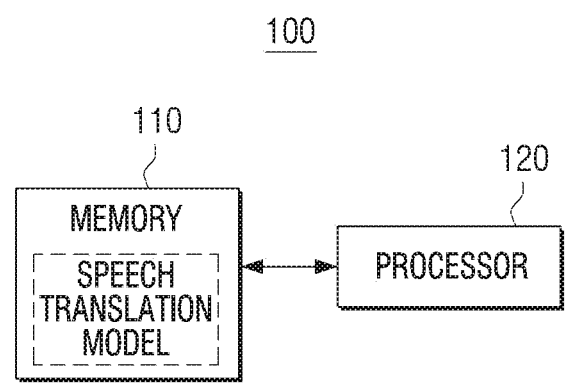
FIG. 2 is a diagram illustrating components of an electronic device according to an embodiment of the disclosure.

FIG. 2 is a diagram illustrating components of an electronic device according to an embodiment of the disclosure.

Referring to FIG. 2, the electronic device 100 includes a memory 110 and a processor 120.

Referring to FIG. 2, the memory 110 may store a speech translation model. Here, the speech translation model may be an artificial intelligence model converting a speech in a first language into a text in a second language.

An artificial intelligence model may consist of a plurality of neural network layers. Each of the plurality of neural network layers has a plurality of weight values, and performs a neural network operation through an operation between the operation result of the previous layer and the plurality of weight values. The plurality of weight values included in the plurality of neural network layers may be optimized by a learning result of the artificial intelligence model. For example, during a learning process, the plurality of weight values may be updated so that a loss value or a cost value acquired at the artificial intelligence model is reduced or minimized. An artificial neural network may include a deep neural network. For example, there may be a convolutional neural network (CNN), a deep neural network (DNN), a recurrent neural network (RNN), a restricted Boltzmann machine (RBM), a deep belief network (DBN), a bidirectional recurrent deep neural network (BRDNN), or deep Q-networks, and the like, but the disclosure is not limited to the aforementioned examples.

In addition, the memory 110 may store data wherein a speech in a first language is converted into a text in a second language as learning data for training the speech translation model.

In addition, the memory 110 may store data wherein a speech in a first language is converted into a text in the first language, and data wherein a speech in a second language is converted into a text in the second language through a speech recognition model, and data wherein a text in a first language is converted into a text in a second language through a machine translation model.

Here, a speech recognition model is a model converting a speech into a text, and may be implemented as an automatic speech recognition (ASR) model. A speech recognition model may include an acoustic model and a language model, and a speech recognition model for a first language and a speech recognition model for a second language may include different acoustic models and language models. According to an embodiment of the disclosure, data wherein a speech in a first language was converted into a text in the first language and data wherein a speech in a second language was converted into a text in the second language through an external speech recognition model may be received, and stored in the memory 110.

A machine translation model is a model converting a text in a first language into a text in a second language, and may be implemented as a neural machine translation (NMT) model. According to an embodiment of the disclosure, data wherein a text in a first language was converted into a text in a second language through an external machine translation model may be received and stored in the memory 110.

However, the disclosure is not limited thereto, and a speech recognition model and a machine translation model may be provided in the electronic device 100.

Meanwhile, according to control by the processor 120, the speech translation model stored in the memory 110 (e.g., a non-volatile memory) may be loaded on an internal memory (e.g., a volatile memory) of the processor 120.

The processor 120 may be electronically connected with the memory 110 and control the overall operations of the electronic device 100. The processor 120 controls the overall operations of the electronic device 100 by using various kinds of instructions or programs stored in the memory 110.

In addition, the processor 120 may train the speech translation model based on first information related to conversion between a speech in a first language and a text corresponding to the speech in the first language, and second information related to conversion between a text in a first language and a text in a second language corresponding to the text in the first language.

Here, the first information may be information acquired through a speech recognition model. A speech recognition model is a model converting a speech into a text, and may be implemented as an automatic speech recognition (ASR) model. According to an embodiment of the disclosure, the processor 120 may acquire first information based on data wherein a speech in a first language was converted into a text in the first language through a speech recognition model. Here, data wherein a speech in a first language was converted into a text in the first language may be an open source existing outside. For example, information on a lecturer's speech in a lecture video and subtitles provided in the lecture video may be used as data wherein a speech in a first language was converted into a text in the first language. In other words, even if a speech recognition model is not provided on the electronic device 100, the electronic device 100 may acquire data wherein a speech in a first language was converted into a text in the first language. Meanwhile, depending on cases, the processor 120 may acquire data wherein a speech in a first language was converted into a text in the first language through a speech recognition model provided on the electronic device 100. In addition, first information may be acquired based on first sample data including a speech in a first language and a text corresponding to the speech in the first language.

In addition, second information may be information acquired through a machine translation model. A machine translation model is a model converting a text in a first language into a text in a second language, and may be implemented as a neural machine translation (NMT) model. According to an embodiment of the disclosure, the processor 120 may acquire second information based on data wherein a text in a first language was converted into a text into a second language through a machine translation model. Here, data wherein a text in a first language was converted into a text into a second language may be an open source existing outside. In other words, even if a machine translation model is not provided on the electronic device 100, the electronic device 100 may acquire data wherein a text in a first language was converted into a text in a second language. Meanwhile, depending on cases, the processor 120 may acquire data wherein a text in a first language was converted into a text in a second language through a machine translation model provided on the electronic device 100. In addition, second information may be acquired based on second sample data including a text in a first language and a text in a second language corresponding to the text in the first language.

The processor 120 may make weight value information corresponding to each of the plurality of neural network layers meta-learn based on the first information and the second information. Here, meta-learning means a method of learning a learning process. Meta-learning according to an embodiment of the disclosure may be performed in a model-agnostic meta-learning (MAML) method. Model-agnostic meta-learning (MAML) is generally a method of meta-learning which is appropriate for training a model in a situation wherein learning data is insufficient.

In other words, in case the amount of data wherein a speech in a first language is converted into a text in a second language is insufficient for training the speech translation model, model-agnostic meta-learning may be performed based on data wherein a speech in a first language is converted into a text in the first language and data wherein a text in a first language is converted into a text in a second language that can be acquired relatively easily.

Meanwhile, it is desirable that the processor 120 trains the speech translation model not only based on the first information and the second information but also third information related to conversion between a speech in a second language and a text corresponding to the speech in the second language. In other words, weight value information may be learned based on the first information, the second information, and the third information. This is because the accuracy of the speech translation model can be improved in case the third information related to conversion between a speech in a second language and a text corresponding to the speech in the second language is also used as learning data training the speech translation model.

Here, data wherein a speech in a second language was converted into a text in the second language may also be an open source existing outside. For example, speech and subtitle information acquired from a video wherein the cast's speech and subtitles corresponding thereto exist may be used as data wherein a speech in a second language was converted into a text in the second language.

In other words, even if a speech recognition model for a second language is not provided on the electronic device 100, the electronic device 100 may acquire data wherein a speech in a second language was converted into a text in the second language. Meanwhile, depending on cases, the processor 120 may acquire data wherein a speech in a second language was converted into a text in the second language through a speech recognition model provided on the electronic device 100.

Meanwhile, the processor 120 may fine-tune the learned weight value information to correspond to the speech translation model, as described above. In other words, weight value information may be updated to be appropriate for the speech translation model. Specifically, weight value information may be fine-tuned by a gradient descent method.

As described above, the speech translation model trained by a method wherein fine-tuned weight value information is applied to the plurality of neural network layers included in the speech translation model may convert a speech in a first language into a text in a second language, and output the text.

In other words, without a speech recognition model and a machine translation model being provided separately, a speech in a first language may be converted into a text in a second language through the speech translation model implemented as a single artificial intelligence model. Accordingly, there is no unnecessary increase of resources, and thus relatively short time may be consumed until a user acquires a translated result text.

Meanwhile, the speech translation model may be trained by using a sequence-to-sequence (seq2seq) model. Here, a sequence-to-sequence model has a structure of outputting a sequence of another domain from an input sequence. A sequence-to-sequence structure wherein an input sequence is set as a speech and an output sequence is set as a translated text for the speech may be included in the speech translation model. A sequence-to-sequence model may include an encoder and a decoder. An encoder may sequentially receive inputs of all words included in the input speech and compress all word information and generate a vector. Such a vector may be a context vector. If information of the input speech is compressed as one context vector, the encoder may transmit the context vector to the decoder. The decoder may receive the context vector, and sequentially output the translated words one by one. Then, a correct answer text for the speech input into the decoder may be input and the sequence-to-sequence model may be trained. Detailed explanation in this regard will be made with reference to FIG. 3.

Meanwhile, the trained speech translation model may be updated by comparing a text in a second language which is a converted form of a speech in a first language through the speech translation model and a text in a second language acquired by applying first information and second information to a speech in a first language.

First information and second information are learning data of the speech translation model, and may have relatively higher accuracy compared to data output through the trained speech translation model. Accordingly, the accuracy of the speech translation model may be improved in case the speech translation model is trained by comparing a text in a second language output by the trained speech translation model with first information and second information.

In addition, in case a correct answer text corresponding to a user speech in a first language input into the speech translation model is input into the speech translation model, the speech translation model may be trained by comparing information of a text in a second language corresponding to the speech in the first language output from the speech translation model with the correct answer text.

Meanwhile, first information may include information acquired based on a conversion rule between a speech in a first language and a text corresponding to the speech in the first language, and second information may include information acquired based on a conversion rule between a text in a first language and a text in a second language corresponding to the text in the first language. In other words, the processor 120 may learn a rule related to conversion between a speech in a first language and a text corresponding to the speech in the first language, and learn a rule related to conversion between a text in a first language and a text in a second language corresponding to the text in the first language, and thereby make the speech translation model learn weight value information.

Figure 3:
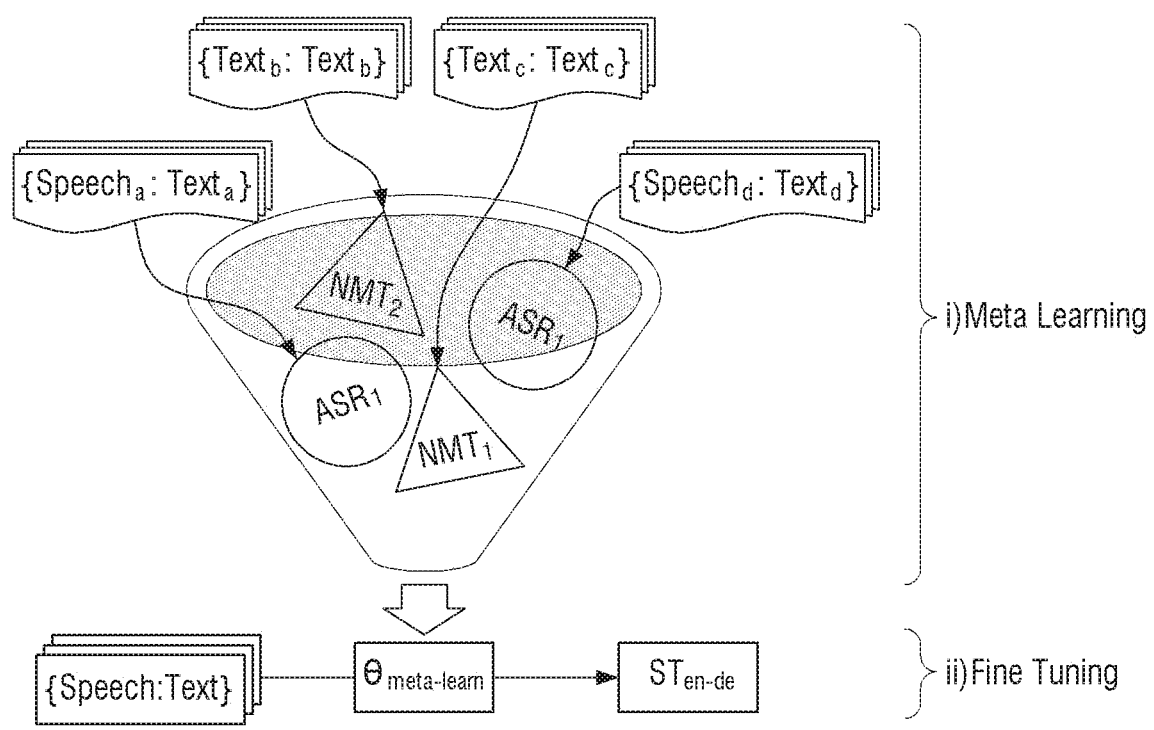
FIG. 3 is a diagram illustrating a process wherein weight value information is learned according to an embodiment of the disclosure.

FIG. 3 is a diagram illustrating a process wherein weight information is learned according to an embodiment of the disclosure.

Referring to FIG. 3, the speech translation model may be trained through a meta-learning operation wherein weight value information is learned based on data wherein a speech in a first language is converted into a text in the first language, data wherein a text in a first language is converted into a text in a second language, data wherein a speech in a second language is converted into a text in the second language, and data wherein a text in a second language is converted into a text in a first language, and an operation wherein weight value information is fine-tuned to correspond to the speech translation (ST) model.

Meanwhile, a sequence-to-sequence structure may be used for such a speech translation model. A sequence-to-sequence (seq2seq) structure models a conditional probability ($p(y|x, \theta)$) and generates a target sequence $y=\{y1, \ldots, yn\}$ by using a source sequence $x=\{x1, \ldots, xm\}$. In general, a seq2seq structure may include an encoder $\theta e$ that calculates $\hat{X}=\{\tilde{x}_1, \ldots, \tilde{x}_m\} \in \mathbb{R}^{m \times d}$ which is an expression corresponding to x, and a decoder $\theta d$ related to reading output of the encoder and predicting distribution of each token of a target language (a second language). For maximizing the log likelihood, a data set of D parallel sequences are learned.

$$\ell(D; \theta) = -\frac{1}{|D|} \sum_{i=1}^{N} \log p(y^i | x^i; \theta),$$

Equation 1 where $\theta = \{\theta_e, \theta_d\}$.

A speech recognition (automatic speech recognition, ASR) task, a machine translation (MT) task, and a speech translation (ST) task according to an embodiment of the disclosure may be performed while sharing the same seq2seq structure. An input for a machine translation (MT) task may be characters or word piece tokens. In addition, in a speech recognition task and a speech translation task, a speech signal may be an input. Here, each speech signal may be displayed by an 80 channel log mel filterbank function in a 25 ms window wherein the size of hops accumulated by a delta and a delta-delta function is 10 ms. Meanwhile, an output in a speech recognition task, a machine translation task, and a speech translation task may be characters or word piece tokens. A seq2seq structure will be described with reference to FIG. 4.

Figure 4:
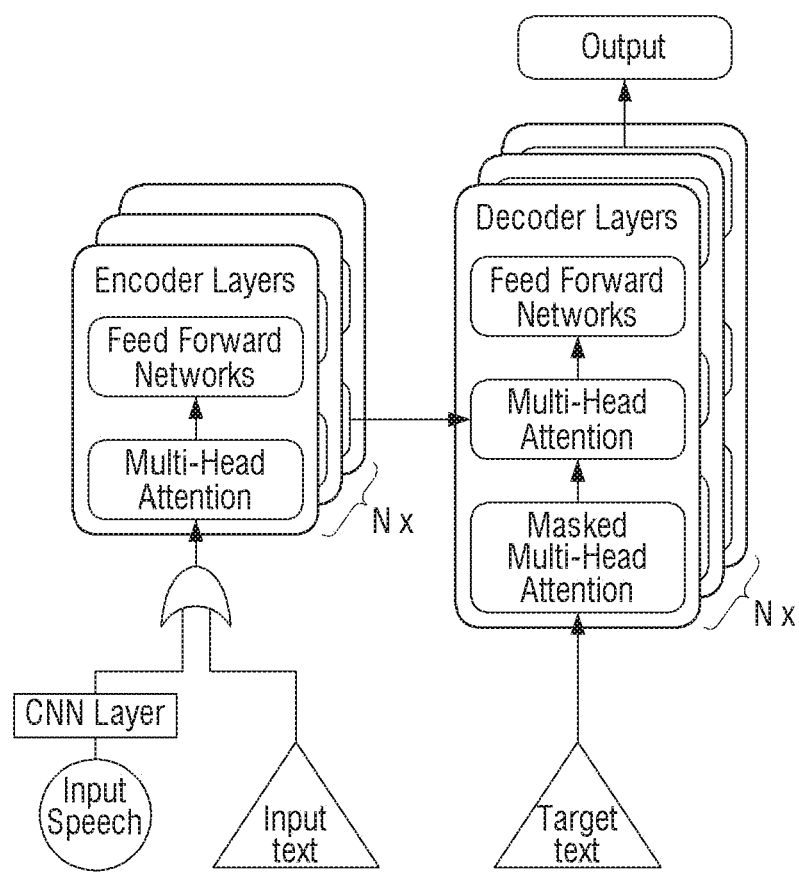
FIG. 4 is a diagram illustrating a sequence-to-sequence structure according to an embodiment of the disclosure.

FIG. 4 is a diagram illustrating a sequence-to-sequence structure according to an embodiment of the disclosure.

Referring to FIG. 4, a compression layer may be added to a seq2seq structure and applied to a speech recognition task, a machine translation task, and a speech translation task. A speech sequence may generally be expressed by using a mel filterbank function which is several times longer than a text sequence. Accordingly, with respect to both time and frequency dimensions, two 3×3 convolutional neural network (CNN) layers may be laminated in a stride of two and the length may be compressed, and the structural location of a speech signal may be utilized. A signal compressed as above may be transmitted to a self-attention layer of the encoder later.

Encoder and decoder blocks of seq2seq may respectively consist of the same layers of stacks N and M. In each layer of the encoder, a multi-head attention mechanism and a feed forward network which are two sub layers may be included. In addition, each decoder layer may consist of three sub layers. The first and third sub layers are similar to the sub layer of the encoder, and the additional second sub layer may be used for calculating an encoder-decoder attention (context) vector based on a soft-attention basis access method.

Referring to FIG. 3, the performance of the aforementioned seq2seq model may be deteriorated in case learning data is relatively small. However, such a problem may be resolved by sharing knowledge between a model of small learning data and a module of large learning data through a model agnostic meta-learning (MAML) algorithm. An access method of MAML may be setting a model wherein there is a large amount of learning data as the source task τ0 to find an appropriate initialization point θ0 of a parameter for a target model of small learning data. Here, a parameter is the same meaning as a weight value of a layer.

According to an embodiment of the disclosure, the concept of MAML may be extended to meta-learning for a task of different input and output modalities. For example, speech recognition and machine translation which are source tasks may respectively be a speech-text modality and a text-text modality. Afterwards, the speech translation model which is a target task may be fine-tuned from the parameter θm of the meta-learning model. Such a process may be understood as in the following Equation 2.

$$\theta^* = \text{Learn}(ST; \text{Meta-Learn}(ASR, MT)).$$

Equation 2

A low resource (small learning data) scenario may be simulated by using source tasks, such as ASR and MT, and θ0 for an ST task may be found. For obtaining θ0=θm, the following meta object function $\ell(\theta^m)$ may be defined.

$$\ell(\theta^m) = E_\tau E_{D_k, D'_k} [\ell(D_\tau; \ell(D'_\tau; \theta^m))]$$

Equation 3

Here, τ may be a task sampled randomly to perform one meta-learning operation. In addition, Dτ and Dτ' may follow uniform distribution of the τ data set.

A meta object function may be maximized by using a gradient descent algorithm. For each meta-learning operation, a source task τ may be uniformly sampled randomly from {ASR, MT}. Then, Dτ and Dτ' may be sampled independently from the selected source task τ. By using Dτ, learning of each task may be simulated, and the result may be evaluated by using Dτ'. An operation which is a sub gradient operation and an operation of simulating learning of each task is referred to as a gradient operation. A sub parameter θα may be updated by using the sub gradient operation and a parameter α as below.

$$\theta_\tau^\alpha = \theta^m - \alpha \nabla_{\theta^m} \ell(D_\tau; \theta^m)$$

Equation 4

When learning of each task is performed, a sub parameter θa may be evaluated for the previously sampled Dτ'. A gradient calculated for the loss generated during such evaluation may be referred to as a meta-gradient. A meta parameter θm may be updated by a meta-gradient, and calculated by the following Equation 5.

$$\theta_\tau^m = \theta^m - \beta \nabla_{\theta^\alpha} \ell(D'_\tau; \theta^\alpha)$$

Equation 5

Here, β is the learning rate. When evaluating a meta-gradient through a sub gradient, a second derivate may be used. Accordingly, by using a vanilla MAML algorithm, a first-order approximation may be used while calculating a meta-gradient.

The meta-learned parameter θm may be updated through the Equation 5, and a new learning task may be applied by using small learning data.

A vanilla MAML algorithm may not deal with different output modality tasks. In the modality agnostic meta-learning suggested here, an additional compression layer of an input speech signal may be used, but an input text sequence may not be required. For resolving the previous limitation, general vocabulary may be generated in all tasks. In addition, a compression layer may be dynamically inactivated whenever an MT task is sampled in the meta-learning operation. For example, learning data related to MT may not influence the parameter of a compression layer.

During the meta-learning operation, the parameter θm may be exposed to vast learning data in the form of speech-text through ASR and vast learning data in the form of text-text through MT. Accordingly, parameters of all sub layers, such as compression, encoder, decoder, encoder-decoder attention and output layers may be trained with respect to each linguistic expression and translation relation.

Accordingly, although the meta-learned parameter θm is not appropriate for an ST task, it may be an appropriate starting point for learning an ST task which is a target model. In the fine-tuning operation, model learning may proceed like a general neural network without subsidiary update. The overview of the suggested MAML access method is as follows.

```
1 Input: Training examples from source tasks,
T = {ASR, MT} and target ST task.
    2 Input: Hyperparameters, such as learning rates, α and β
    3 Randomly initialize model parameters θ^m.
        4 While not done do
            5 sample task, τ from T
            6 Assign θ^α = θ^m
            7 Sample K data points, Dτ = {x(i), y(i)}_{i=1}^k from τ
            8 compute ∇_θ ℓ^{mf}(D_τ ; θ^m) using D_τ and θ^m
            9 Meta-train: update θ^α
            10 sample l data points, Dτ' = {x'(i), y'(i)}_{i=1}^l from τ
            11 compute ∇_θ ℓ^{αℓ}(D_τ'; θ^α) using D_τ' and θ^m
            12 Meta-Test: update θ^m
    13 end
    14 assign θ = θ^m
    15 while not done do
            16 sample m data points, Dst = {x(i), y(i)}_{i=1}^m ∈ ST task
            17 compute ∇_θ ℓ(D_{st} ; θ) using D_{st} and θ
            18 Finetune: Update θ with gradient descent:
θ = θ − γ∇_θ ℓ(D_{st} ; θ)
19 end
20 Return: θ
```

By performing a method as above sequentially, weight value information may be learned.

Figure 5:
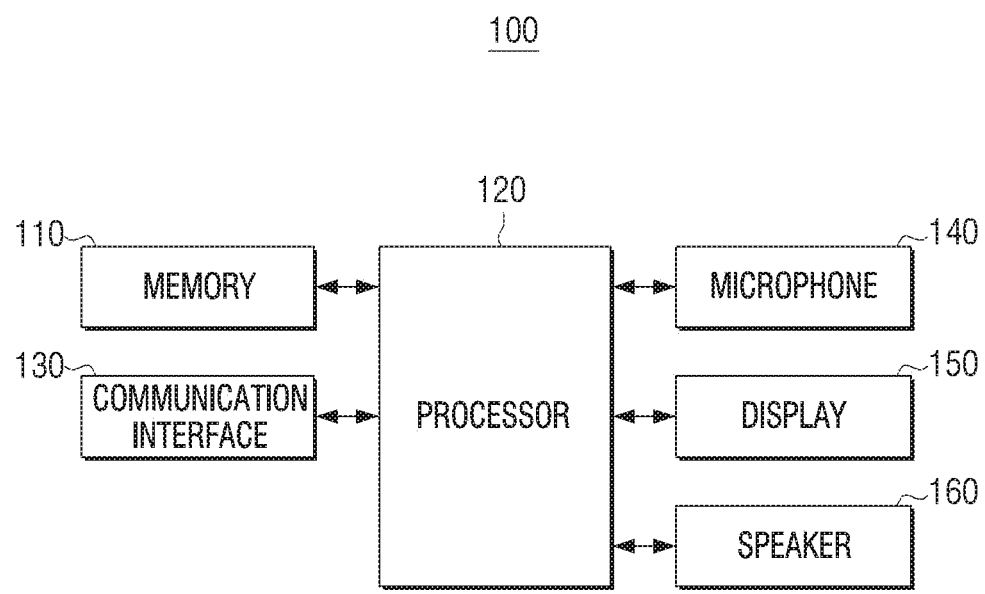
FIG. 5 is a block diagram illustrating a configuration of an electronic device according to an embodiment of the disclosure.

FIG. 5 is a block diagram illustrating a configuration of an electronic device according to an embodiment of the disclosure.

Referring to FIG. 5, the electronic device 100 may include a communication interface 130, a memory 110, a microphone 140, a display 150, a speaker 160, a sensor 170, and a processor 120. Meanwhile, regarding the components of the electronic device 100 illustrated in FIG. 5, some components can obviously be added or omitted according to the type of the electronic device 100.

The memory 110 may store instructions or data related to at least one other component of the electronic device 100. In particular, the memory 110 may include a non-volatile memory and a volatile memory, and for example, it may be implemented as a flash-memory, a hard disk drive (HDD), or a solid state drive (SDD), and the like. In addition, the memory 110 may be accessed by the processor 120, and reading/recording/correction/deletion/update, and the like, of data by the processor 120 may be performed. In addition, the memory 110 may store an artificial intelligence agent for operating a conversation system. Specifically, the electronic device 100 may use an artificial intelligence agent for generating a natural language or acquiring a control command in response to a user utterance. Here, an artificial intelligence agent is a dedicated program for providing artificial intelligence-based services (e.g., a speech recognition service, an agent service, a translation service, a search service, and the like). In particular, an artificial intelligence agent may be executed by a generic-purpose processor of the related art (e.g., a central processing unit (CPU)), or a separate artificial intelligence (AI)-dedicated processor (e.g., a graphics processing unit (GPU), a numeric processing unit (NPU), and the like).

The processor 120 may be electronically connected with the memory 110 and control the overall operations of the electronic device 100. The processor 120 controls the overall operations of the electronic device 100 by using various kinds of instructions or programs stored in the memory 110. In particular, according to an embodiment of the disclosure, the main CPU may copy a program in the random access memory (RAM) according to an instruction stored in the read only memory (ROM), and access the RAM and execute the program. Here, a program may include an artificial intelligence model, and the like.

In particular, a function related to artificial intelligence according to the disclosure is operated through the processor 120 and the memory 110. The processor 120 may consist of one or a plurality of processors. Here, the one or plurality of processors may be generic-purpose processors like CPUs, APs, and digital signal processors (DSPs), graphic-dedicated processors like GPUs and vision processing units (VPUs), or artificial intelligence-dedicated processors like NPUs. The one or plurality of processors perform control such that input data is processed according to a predefined operation rule stored in the memory 110 or an artificial intelligence model. Alternatively, in case the one or plurality of processors are artificial intelligence-dedicated processors, the artificial intelligence-dedicated processors may be designed as a hardware structure specified for processing of a specific artificial intelligence model.

A predefined operation rule or an artificial intelligence model are characterized in that it is made through learning. Here, being made through learning means that a basic artificial intelligence model is trained by using a plurality of learning data by a learning algorithm, and a predefined operation rule or an artificial intelligence model set to perform a desired characteristic (or, purpose) is made. Such learning may be performed in a device itself wherein artificial intelligence is performed according to the disclosure, or performed through a separate server and/or system. As examples of learning algorithms, there are supervised learning, unsupervised learning, semi-supervised learning, or reinforcement learning, but learning algorithms are not limited to the aforementioned examples.

The communication interface 130 is a component performing communication with various types of external devices according to various types of communication methods. The communication interface 130 may include a Wi-Fi module, a Bluetooth module, an infrared communication module, a wireless communication module, and the like. In particular, the processor 120 may perform communication with various types of external devices by using the communication interface 130. Here, the communication interface 130 may perform communication with an external server for speech recognition, machine translation, and speech translation. For example, the communication interface 130 may receive data wherein a speech in a first language was converted into a text in the first language, data wherein a speech in a second language was converted into a text in the second language, data wherein a text in a first language was converted into a text in a second language through a machine translation model, and data wherein a speech in a first language was converted into a text in a second language through a speech translation model from an external server, through speech recognition.

The microphone 140 is a component for receiving input of a user speech, and may be provided in the electronic device 100, but this is merely an example, and the microphone 140 may be connected with the electronic device 100 via wire or wirelessly on the outside of the electronic device 100. In particular, the microphone 140 may receive a user speech for controlling the electronic device 100 or external devices around the electronic device 100.

The display 150 may display a text translated from the speech translation model. In particular, the display 150 may be implemented as displays in various forms, such as a liquid crystal display (LCD), organic light emitting diodes (OLED) display, a plasma display panel (PDP), and the like. In the display 150, driving circuits that may be implemented in forms, such as an a-si thin film transistor (TFT), a low temperature poly silicon (LTPS) TFT, an organic TFT (OTFT) and the like, a backlight unit, and the like, may also be included together. Meanwhile, the display 150 may also be implemented as a touch screen combined with a touch sensor, a flexible display, a three dimensional (3D) display, and the like.

The speaker 160 may be a component outputting data in a second language which is a translated form of a first language through the speech translation model. Here, the electronic device 100 may include an audio outputting device like the speaker 160, but it may also include an outputting device like an audio outputting terminal.

Figure 6:
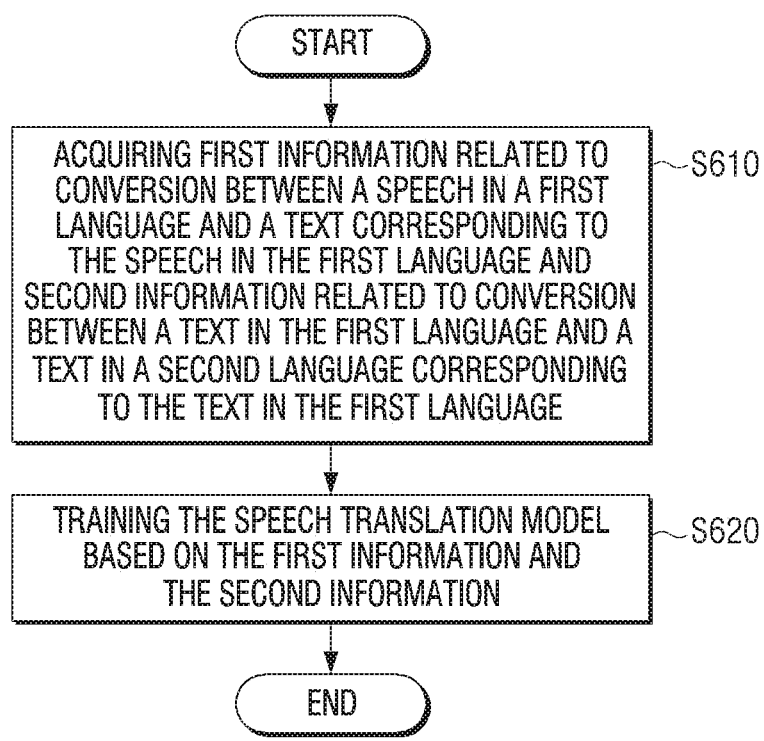
FIG. 6 is a flowchart illustrating a method of controlling an electronic device according to an embodiment of the disclosure.

FIG. 6 is a flowchart illustrating a method of controlling an electronic device according to an embodiment of the disclosure.

Referring to FIG. 6, the electronic device 100 may acquire first information related to conversion between a speech in a first language and a text corresponding to the speech in the first language, and second information related to conversion between a text in the first language and a text in a second language corresponding to the text in the first language at operation S610.

Here, the first information may be acquired based on first sample data including a speech in a first language and a text corresponding to the speech in the first language, and the second information may be acquired based on second sample data including a text in a first language and a text in a second language corresponding to the text in the first language.

The electronic device 100 may train the speech translation model based on the first information and the second information at operation S620.

Here, the speech translation model may be trained to convert a speech in a first language into a text in a second language and output the text, and specifically, it may be trained by using a sequence-to-sequence model.

The speech translation model may include a plurality of neural network layers, and may make weight value information corresponding to each of the plurality of neural network layers meta-learn based on the first information and the second information. Here, the meta-learning may be a model-agnostic meta-learning (MAML) method.

The electronic device 100 may fine-tune the learned weight value information to correspond to the speech translation model.

Meanwhile, the first information may include information acquired based on a conversion rule between a speech in the first language and a text corresponding to the speech in the first language, and the second information may include information acquired based on a conversion rule between a text in the first language and a text in the second language corresponding to the text in the first language.

Meanwhile, the trained speech translation model may be updated by comparing a text in the second language which is a converted form of a speech in the first language through the speech translation model and a text in the second language acquired by applying the first information and the second information to a speech in the first language.

The speech translation model is trained as described above, and the speech translation model may be implemented as a single artificial intelligence model converting a speech in the first language into a text in the second language without including a separate speech recognition model and a separate machine translation model.

Meanwhile, it is desirable that the electronic device 100 trains the speech translation model based on the first information, the second information, and the third information related to conversion between a speech in the second language and a text corresponding to the speech in the second language. In this case, the accuracy of the speech translation model may be improved.

Meanwhile, as terms used in the embodiments of the disclosure, general terms that are currently used widely were selected as far as possible, based on the functions described in the disclosure. However, the terms may vary depending on the intention of those skilled in the art who work in the pertinent field, previous court decisions, or emergence of new technologies. In addition, in particular cases, there are terms that were designated by the applicant on his own, and in such cases, the meaning of the terms will be described in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in the detailed description. However, it should be noted that the various embodiments are not for limiting the scope of the disclosure to a specific embodiment, but they should be interpreted to include all modifications, equivalents, or alternatives of the embodiments included in the ideas and the technical scopes disclosed herein. Meanwhile, in case it is determined that in describing embodiments, detailed explanation of related known technologies may unnecessarily confuse the gist of the disclosure, the detailed explanation will be omitted.

Meanwhile, singular expressions also include plural expressions, as long as they do not obviously mean differently in the context. In addition, in the disclosure, terms, such as "include" and "consist of" should be construed as designating that there are such characteristics, numbers, operations, elements, components, or a combination thereof described in the specification, but not to exclude in advance the existence or possibility of adding one or more of other characteristics, numbers, operations, elements, components, or a combination thereof.

In addition, the expressions "first," "second," and the like used in this specification may be used to describe various elements regardless of any order and/or degree of importance. In addition, such expressions are used only to distinguish one element from another element, and are not intended to limit the elements.

Meanwhile, the term "a part" or "a module" used in the disclosure includes a unit consisting of hardware, software, or firmware, and it may be interchangeably used with terms, for example, logic, a logical block, a component, or a circuit. In addition, "a part" or "a module" may be a component consisting of an integrated body or a minimum unit performing one or more functions or a portion thereof. For example, a module may consist of an application-specific integrated circuit (ASIC).

The various embodiments of the disclosure may be implemented as software including instructions stored in machine-readable storage media, which can be read by machines (e.g., computers). The machines refer to devices that call instructions stored in a storage medium, and can operate according to the called instructions, and the devices may include an electronic device according to the aforementioned embodiments (e.g., the electronic device 100). In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

In addition, according to an embodiment of the disclosure, the method according to the various embodiments described above may be provided while being included in a computer program product. A computer program product refers to a product, and it can be traded between a seller and a buyer. A computer program product can be distributed on-line in the form of a storage medium that is readable by machines (e.g., a compact disc read only memory (CD-ROM)), or through an application store (e.g., play store™). In the case of on-line distribution, at least a portion of a computer program product may be stored in a storage medium, such as the server of the manufacturer, the server of the application store, and the memory of the relay server at least temporarily, or may be generated temporarily.

Further, each of the components according to the aforementioned various embodiments (e.g., a module or a program) may consist of a singular object or a plurality of objects. In addition, among the aforementioned corresponding sub components, some sub components may be omitted, or other sub components may be further included in the various embodiments. Generally or additionally, some components (e.g., a module or a program) may be integrated as an object, and perform the functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a memory configured to store a speech translation model including a plurality of neural network layers; and
at least one processor electronically connected with the memory,
wherein the at least one processor is configured to:
train the speech translation model based on first information related to conversion between a speech in a first language and a text corresponding to the speech in the first language, and
second information related to conversion between a text in the first language and a text in a second language corresponding to the text in the first language, and
wherein the speech translation model is trained to convert a speech in the first language into a text in the second language and output the text,
wherein the speech translation model is configured to perform a meta-learning for parameters corresponding to each of the plurality of neural network layers based on the first information and the second information, and
wherein the at least one processor is further configured to:
sample a data set randomly based on a source task comprising automatic speech recognition (ASR) task and machine translation (MT) task,
sample first uniform distribution data and second uniform distribution data based on the data set, the first uniform distribution data being used for simulating a learning of each task, and the second uniform distribution data being used for evaluating a learning result,
update a meta parameter based on a sub parameter, the second uniform distribution data, and a learning rate, and
set the updated meta parameter as an initial parameter of the speech translation model.

2. The electronic device of claim 1, wherein the at least one processor is further configured to:
fine-tune the learned weight value information to correspond to the speech translation model.

3. The electronic device of claim 1, wherein the at least one processor is further configured to:
train the speech translation model based on the first information, the second information, and third information related to conversion between a speech in the second language and a text corresponding to the speech in the second language.

4. The electronic device of claim 1,
wherein the first information is acquired based on first sample data including a speech in the first language and a text corresponding to the speech in the first language, and
wherein the second information is acquired based on second sample data including a text in the first language and a text in the second language corresponding to the text in the first language.

5. The electronic device of claim 1, wherein the speech translation model is trained by using a sequence-to-sequence model.

6. The electronic device of claim 1, wherein the trained speech translation model is updated by comparing a text in the second language which a speech in the first language is converted through the speech translation model and a text in the second language acquired by applying the first information and the second information to a speech in the first language.

7. The electronic device of claim 1,
wherein the first information includes information acquired based on a conversion rule between a speech in the first language and a text corresponding to the speech in the first language, and
wherein the second information includes information acquired based on a conversion rule between a text in the first language and a text in the second language corresponding to the text in the first language.

8. The electronic device of claim 1,
wherein the speech translation model is implemented as a single artificial intelligence model.

9. A method of controlling an electronic device storing a speech translation model including a plurality of neural network layers, the method comprising:
acquiring first information related to conversion between a speech in a first language and a text corresponding to the speech in the first language, and second information related to conversion between a text in the first language and a text in a second language corresponding to the text in the first language; and
training the speech translation model based on the first information and the second information, wherein the speech translation model is trained to convert a speech in the first language into a text in the second language and output the text, wherein the training the speech translation model performs a meta-learning for parameters corresponding to each of the plurality of neural network layers based on the first information and the second information, and wherein the training the speech translation model comprises:

sampling a data set randomly based on a source task comprising automatic speech recognition (ASR) task and machine translation (MT) task, sampling first uniform distribution data and second uniform distribution data based on the data set, the first uniform distribution data being used for simulating a learning of each task, and the second uniform distribution data being used for evaluating a learning result, updating a meta parameter based on a sub parameter, the second uniform distribution data, and a learning rate, and setting the updated meta parameter as an initial parameter of the speech translation model.

10. The method of claim 9, further comprising:
fine-tuning the learned weight value information to correspond to the speech translation model.

11. The method of claim 9, wherein the training of the speech translation model comprises:
training the speech translation model based on the first information, the second information, and third information related to conversion between a speech in the second language and a text corresponding to the speech in the second language.

12. The method of claim 9,
wherein the first information is acquired based on first sample data including a speech in the first language and a text corresponding to the speech in the first language, and wherein the second information is acquired based on second sample data including a text in the first language and a text in the second language corresponding to the text in the first language.

13. The method of claim 9,
wherein the speech translation model is trained by using a sequence-to-sequence model.

14. The method of claim 9, wherein the trained speech translation model is updated by comparing a text in the second language which a speech in the first language is converted through the speech translation model and a text in the second language acquired by applying the first information and the second information to a speech in the first language.

15. The method of claim 9,
wherein the first information includes information acquired based on a conversion rule between a speech in the first language and a text corresponding to the speech in the first language, and wherein the second information includes information acquired based on a conversion rule between a text in the first language and a text in the second language corresponding to the text in the first language.

16. The method of claim 9, wherein the speech translation model is implemented as a single artificial intelligence model.

* * * * *